United States Patent [19]

Fellows

[11] Patent Number: 4,913,002
[45] Date of Patent: Apr. 3, 1990

[54] AUTOMATIC CONTINUOUSLY VARIABLE TRANSMISSION OF THE TOROIDAL-RACE ROLLING-TRACTION TYPE

[76] Inventor: Thomas G. Fellows, 1 Greenbrook Ave., Hadley Wood, Barnet, Hertfordshire, United Kingdom, EN4 0LS

[21] Appl. No.: 94,865

[22] Filed: Sep. 10, 1987

Related U.S. Application Data

[63] Continuation-in-part of Ser. No. 904,970, Sep. 8, 1986, abandoned.

[30] Foreign Application Priority Data

Sep. 13, 1985 [GB] United Kingdom ............... 8522682

[51] Int. Cl.$^4$ ..................... F16H 47/08; F16H 37/06
[52] U.S. Cl. .................................. 475/52; 475/53; 475/214
[58] Field of Search .................. 74/740, 796, 721, 688, 74/690, 691, 705, 753, 789

[56] References Cited

U.S. PATENT DOCUMENTS

| | | | |
|---|---|---|---|
| 2,959,985 | 11/1960 | Moore | 74/740 |
| 3,203,278 | 8/1965 | General | 74/691 |
| 3,216,283 | 11/1965 | General | 74/721 |
| 3,267,756 | 8/1966 | De Brie Perry et al. | 74/200 |
| 3,276,279 | 10/1966 | De Brie Perry et al. | 74/200 X |
| 3,293,945 | 12/1966 | Stockton | 74/740 |
| 3,299,743 | 1/1967 | Stockton | 74/690 |
| 3,304,803 | 2/1967 | Stockton | 74/740 |
| 3,306,199 | 2/1967 | Karin et al. | 102/388 |
| 3,406,597 | 10/1968 | De Brie Perry et al. | 74/691 X |
| 3,410,146 | 11/1968 | Nordeen | 74/740 |
| 3,440,895 | 4/1969 | Fellows | 74/200 |
| 3,494,224 | 2/1970 | Fellows et al. | 74/796 X |
| 3,587,345 | 6/1971 | Johnson | 74/688 |
| 3,688,600 | 9/1972 | Leonard | 74/690 |
| 4,019,406 | 4/1977 | Herr | 74/753 |
| 4,638,687 | 1/1987 | De Brie Perry | 74/740 |
| 4,852,427 | 8/1989 | Van Der Veen | 74/740 X |

FOREIGN PATENT DOCUMENTS

| | | |
|---|---|---|
| 0081260 | 6/1983 | European Pat. Off. . |
| 0096980 | 12/1983 | European Pat. Off. . |
| 461904 | 2/1937 | United Kingdom . |
| 677185 | 8/1952 | United Kingdom . |
| 810458 | 3/1959 | United Kingdom . |
| 927418 | 5/1963 | United Kingdom . |
| 1061560 | 3/1967 | United Kingdom . |
| 1078791 | 8/1967 | United Kingdom . |
| 1209322 | 10/1970 | United Kingdom . |
| 1269896 | 4/1972 | United Kingdom . |

OTHER PUBLICATIONS

Automatische Automobil-Getriebe, J. Stuper Wien—New York, Springer-Verlag 1986, pp. 143-144-145.
Technische Rundschau Nr. 11 17.3.1962 "Hydrodynamische Getriebe mit Leistungsverzweigung".

Primary Examiner—Leslie A. Braun
Assistant Examiner—Harold F. Macris
Attorney, Agent, or Firm—Cushman, Darby & Cushman

[57] ABSTRACT

A transmission system for use in automobile vehicles and in which the ratio-varying unit is unidirectional and is of the continuously-variable type, particularly the toroidal-race rolling traction type. An epicyclic combination and a hydrokinetic element are located in succession between the output of the ratio-varying unit and the final drive output of the system as a whole. The epicyclic combination and hydrokinetic element help to overcome two typical problems of transmissions with such ratio-varying units, namely low output torque range and difficulty in starting from rest, and this arrangement and the torque-splitting action of the epicyclic combination enable a smaller element to be used than would be possible if it were located on the input side of the ratio-varying unit. The system also includes a reversing mechanism located downstream of the ratio unit and preferably between the hydrokinetic element and the final drive output. This mechanism, by including gearing of an appropriate ratio, may also serve to limit the maximum speed of the final drive output in reverse compared with its maximum forward speed.

6 Claims, 2 Drawing Sheets

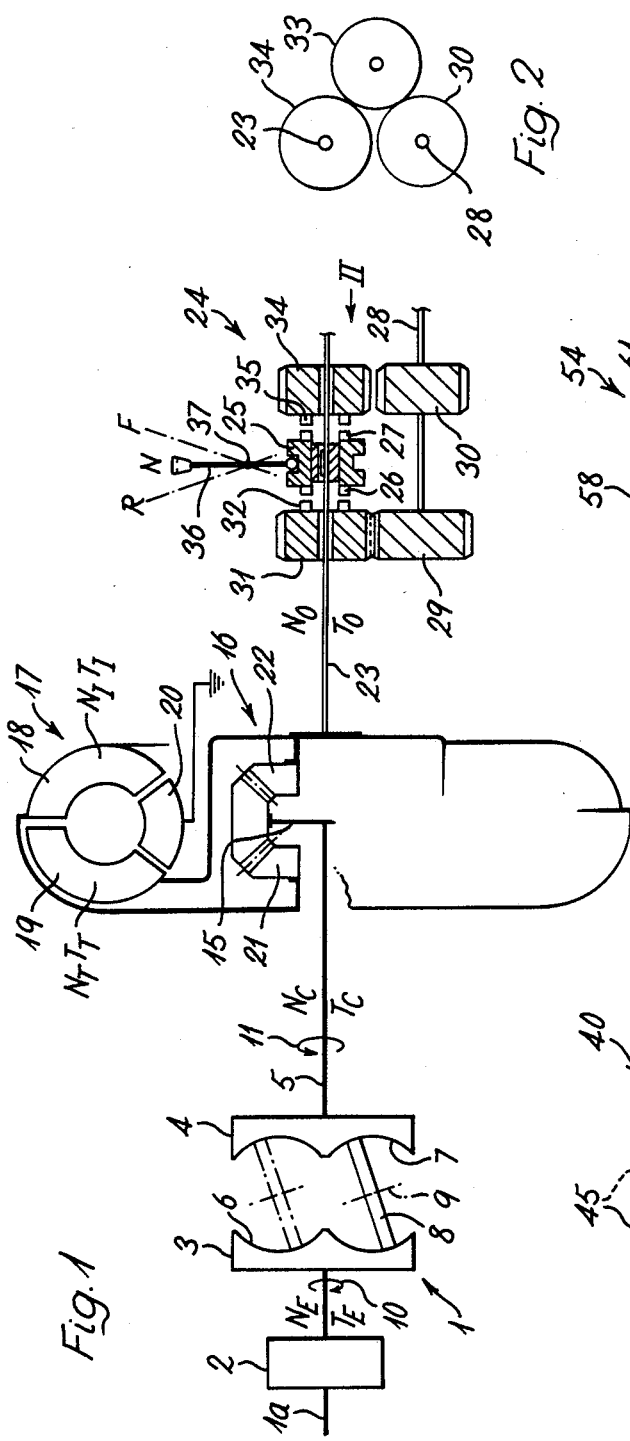
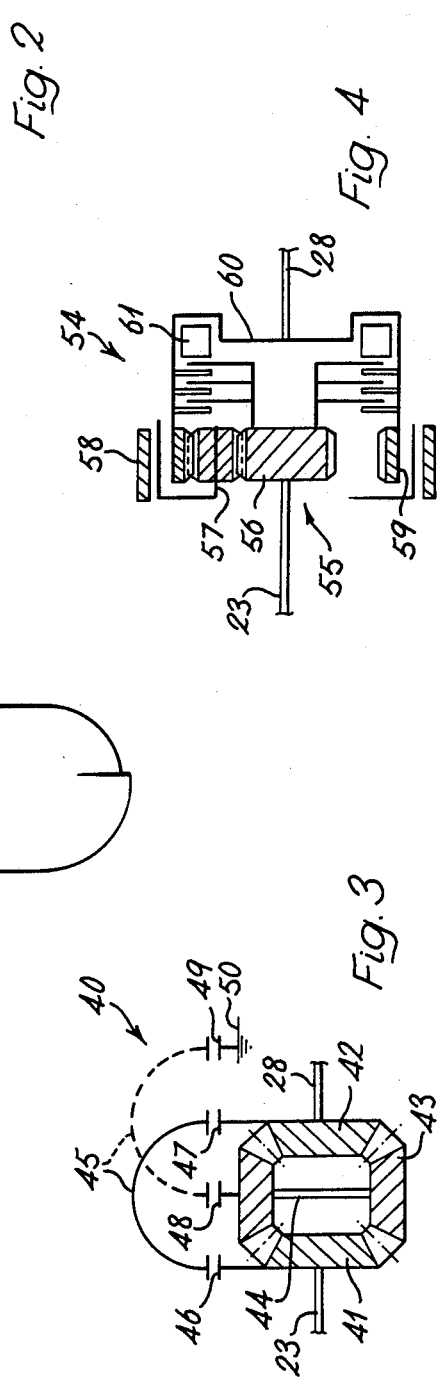

AUTOMATIC CONTINUOUSLY VARIABLE TRANSMISSION OF THE TOROIDAL-RACE ROLLING-TRACTION TYPE

This is a continuation-in-part application of Ser. No. 904,970, filed Sept. 8, 1986, which is now abandoned.

This invention relates to transmission systems, and especially to automatic transmission systems for automobile vehicles. More particularly it relates to such systems in which the ratio-varying unit for "ratio unit") is of the continuously-variable kind and comprises a rotary input member and a rotary output member between which traction is transmitted by a mechanical component of variable orientation. The invention applies especially to systems of unidirectional character, that is to say systems in which the input and output members are each designed so as to rotate in a single direction only, and it applies in particular and will be described in relation to a continuously-variable transmission of the toroidal-race rolling traction type, now often referred to as a Perbury transmission, in which the input and output members are coaxial and rotate in opposite directions.

Among the problems that have to be overcome, when continuously-variable ratio units as just described are used in automotive transmission systems, are the following.

Firstly, some mechanism in addition to the prime mover and unit has to be provided to help start the veicle from rest, because the reciprocating internal combustion engine, which is the most common prime mover, has a minimum running speed of some hundred r.p.m. (and a speed some two to four times greater at which maximum torque is produced) while the ratio unit in its simple form has a lowest speed ratio which is not zero.

Secondly, the output torque range of the ratio unit may typically be insufficient to meet some needs, for instance in low power/weight ratio vehicles which must nevertheless be capable of climbing steep hills and of cruising at high speed without overspeeding the engine.

Thirdly, the ratio unit needs to rotate in order to change ratio, and is likely to be designed and controlled to work the engine mostly at high torque and low speed.

A torque converter in the transmission system can contribute to overcoming all three of the problems just summarize, and the first and third of them will be alleviated even by a simple fluid coupling, but the high torque/low speed engine behavior just mentioned poses further problems of efficiency if a hydrokinetic element is placed between the prime mover and the rato unit. On the other hand, if the element is simply located between the output of the ratio unit and the output of the system as a whole it must be both large and capable of rotating at high speed. For instance, in the quite reasonable case of an automobile having a continuously-variable ratio unit with a torque ratio range from 2.5 to 0.4. on starting the vehicle a hydrokinetic element immediately downstream of the ratio unit output would have to transmit 2.5 times the engine torque at 1/2.5 times engine speed, usually the speed at which the engine develops peak torque.

Such a torque/speed relationship suggests that a hydrokinetic element mounted downstream of the ratio unit would need to be appreciably larger—say 1.5 times as large—as a similar element were it lcoated upstream of the ratio unit. As to speed capability, the downstream-mountd element might well have to rotate at a maximum speed say 20% up on that of the engine itself, while an upstream-mounted element would, of course, rotate only at the same speed as the engine.

The present invention arises in part from appreciating that by splitting the output torque of a ratio unit through an epicyclic combination interposed between the ratio unit and the hydrokinetic element, the torque on the impeller of the element may be reduced and the impeller speed increased, with the consequence that the element could be smaller and need now be no larger in size then would be necessary if it were instead mounted on the input side of the ratio unit. The invention arises also from appreciating that the system must in practice incorporate a reversing mechanism. In certain transmission system using ratio units of the continuously-variable kind it is known, for instance as shown in Japanese patent publication No. 0057558, to locate that mechanism between the prime mover and the input to the ratio unit. The present invention, however, is limited to systems in which the connection between the output of the prime mover and the input to the ratio unit is without means for the reversal of direction, so that a different place within the system has to be found for the reversing mechanism.

The HKE may be a fluid coupling without torque-multiplying effect. Alternatively it may be a torque converter with such effect. The ratio unit may for instance be of the toroidal-race rolling reaction type. The epicyclic combination may comprise three elements arranged in successive engagement, the middle element being a planet carrier.

The reversing mechanism may include gearing adapted to effect a speed reduction, and the reduction in reverse may be greater than in forward operation.

The invention will now be described, by way of example, with reference to the accompanying diagrammatic drawings in which:

FIG. 1 shows a transmission system using a toroidal-race rolling traction ratio unit, and a differential-type epicyclic unit, and a simple parallel-shaft-type reversing mechanism;

FIG. 2 is a simplified view of the reversing mechanism shown in FIG. 1, taken in the direction of the arrow II in FIG. 1;

FIG. 3 shows an alternative reversing mechanism of bevel gear type;

FIG. 4 shows a further alternative reversing mechanism of epicyclic type, and

Figure 5:
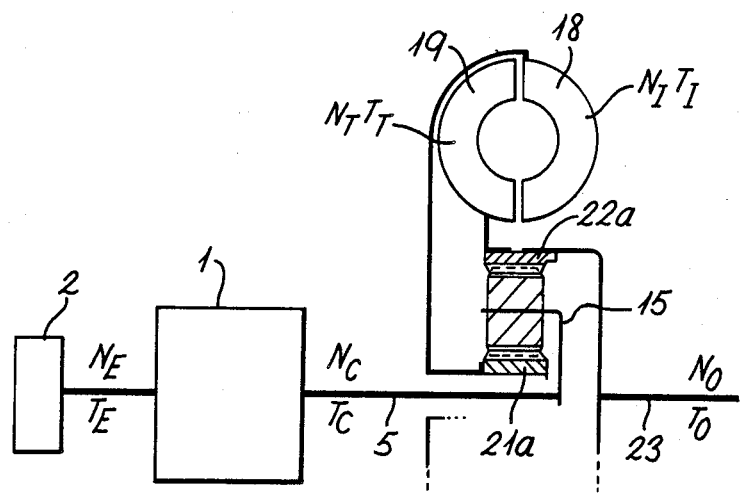
FIG. 5 shows an alternative to part of the transmission system of FIG. 1, in which the elements of the epicyclic combination are spur gears.

FIG. 1 shows a transmission system in which a prime mover is connected to a continuously-variable ratio unit of the toroidal-race rolling traction type indicated generally at 1. Examples of such ratio units are now described in detail in many published documents, including many published patent specifications—for instance U.S. Pat. Nos. 3,406,597 and 3,494,224. The detailed construction of such a ratio unit is not part of the present invention, and FIG. 1 therefore shows only the essential components necesary for an understanding of the present invention. Reference 1a indicates the transmission axis, the prime mover 2 drives an input disc 3 and an output disc 4 is connected to an output shaft 5.

Confronting and part-toroidal races 6 and 7, presented by discs 3 and 4 respectively, both lie on the surface of a single torus with its centre on axis 1a. A roller 8 is one of three, equally spaced around the torus and mounted (by means not shown) so as to be free to rotate about their axes 9. The axes 9 all intersect axis 1a and do so at a common angle, but by moving the mountings of those rollers so that the value of the common angle changes, the ratio of the speeds of rotation of the two discs 3, 4 is varied. As shown in full lines, roller 8 contacts race 6 at a large radius relative to axis 1a and race 7 at a small radius: disc 4 therefore rotates faster than disc 3, and the ratio unit is in high gear setting, i.e. high ratio. If the roller setting is changed to the position shown in dotted lines, in which it contacts race 6 at small radius and race 7 at a larger radius, the unit is in low gear setting or low ratio. An operating characteristic of such ratio units that should be especially noted is that they are unidirectional. That is to say, certain features of their design and operation—features related particularly to the rollers 8 and to the manner in which they move to change ratio—dictate that the input disc shall rotate in one direction (say that of arrow 10) only, and the output disc in the opposite direction (arrow 11).

According to the invention output shaft 5, i.e. the output member of unit 1, is connected to the planet carrier 15 of an epicylic combination 16 of differential layout. The epicyclic combination is associated with a hydrokinetic element (HKE) of torque converter type indicated generally at 17 and comprising an impeller 18, a turbine 19 and a stator 20. A bevel gear 21 of combination 16 is connected to the impeller 18, and the turbine 19 is connected both to the third component (bevel gear 22) of the epicyclic and also to the input shaft 23 of a reversing mechanism 24. Because the ratio unit 1 is of unidirectional character, as already explained, the reversing mechanism 24 therefore cannot be located between prime mover 2 and the input to ratio unit 1, as would be possible in transmissions with bidirectional units. In the mechanism 24 a clutch member 25, carrying oppositely-facing dog teeth 26 and 27, is mounted on shaft 23. Member 25 cannot rotate relative to shaft 23, but is capable of limited axial movement. The final output shaft 28 of the system as a whole is displaced from but parallel to shaft 23, and carries two gears 29 and 30. Gear 29 meshes with a gear 31 which is rotatably mounted on shaft 23 and carries dog teeth 32. Gear 30 engages by way of an idler gear 33 (FIG. 2) with a gear 34 which is rotatably mounted on shaft 23 and carried dog teeth 35. Clutch member 25 can be moved axially to and fro along shaft 23 by a control lever 36, rotatable about a pivot 37. When lever 36 is at one extreme (F) of its pivotal movement, dogs 27 and 35 are out of engagement but dogs 26 and 32 are engaged, so that final output 28 is driven in a forward direction by way of shaft 23, clutch 25, gear 31 and gear 29, while gears 30, 33 and 34 all idle. When lever 36 is in its middle (N) position none of the dogs is in engagement, and final output 28 is therefore at rest. When lever 36 is in its other extreme position (R) dogs 32 and 26 are disengaged but dogs 27 and 35 are engaged, so that final output 28 is driven in reverse by way of clutch 25 and gears 34, 33 and 30 while gears 29 and 31 idle.

The alternative reversing mechanism 40 of FIG. 3 comprises an epicyclic unit of differential layout comprising a bevel gear 41 mounted on shaft 23, a second bevel gear 42 mounted on final output shaft 28 which is now coaxial with shaft 23, and planets 43 mounted on a carrier shoun schematically at 44. In forward motion a clutch member 45 makes engagement with clutch faces 46, 47 attached to gears 41 and 42 respectively, and carrier 44 is free to idle, so that gears 41 and 42 are directly connected and shafts 23 and 28 rotate at the same speed and in the same direction. For reverse motion, clutch member 45 is moved to engage with clutch faces 48 and 49 fixed to the carrier 44 and to the casing 50 of the mechanism 40 respectively. Drive is therefore transmitted between shafts 22 and 28 by way of gear 41, planets 43 and gear 42, so that final output shaft 28 rotates at the same speed as shaft 23 but in the opposite direction, because the illustrated epicyclic unit inherently has a 1:1 ratio.

In the third form of reversing mechanism 54 shown in FIG. 4 an epicyclic unit 55 comprises a sun gear 56 fixed to shaft 23, a planet carrier 57 which can be locked by operation of a brake shown schematically at 58, and an annulus or ring gear 69 connected directly to final output shaft 28 by structure 60. Sun gear 56 is also connectable directly to structure 60 by operation of a clutch 61. When brake 58 is disengaged and clutch 61 engaged, shafts 23 and 28 rotate at the same speed and in the same direction (forward) because they are directly connected by way of sum gear 56, clutch 61 and structure 60. When clutch 61 is disengaged and brake 58 is engaged, shaft 23 drives final output 28 by way of three components 56, 57 and 59 of epicyclic unit 55. The direction of rotation of final output shaft 28 is then reversed, and the ratio between the two speeds (disregarding sign) of the two shafts is determined by the ratio of unit 55.

By placing the reversing mechanism between the epicyclic combination 16 and the final output 28, as shown in FIGS. 1 and 4, certain advantages are obtained. Firstly, the minimum of components within the transmission system as a whole change their direction of rotation upon the change between foward and reverse drive; the low inertias thus encountered promote low loads upon the components of the system, and/or facilitate rapid changes between forward and reverse motions. Secondly the HKE 17, which is unidirectional in character, will have the same characteristics when starting the system in either forward or reverse drive, because the input to the HKE does not change direction. This feature is very signficant, bearing in mind that many torque converters have very different characteristics according to whether their impeller is rotating in the forward or the reverse sense.

Thirdly, the reverse gear reduction ratio of the epicyclic unit 55 of the reversing mechanism 54 of FIG. 4—which may be obtained also in the mechanism 24 of FIGS. 1 and 2 by appropriate choice of ratios for the gears 34, 33 and 30—will have the useful effect of ensuring that the maximum speed of rotation of the final output member 28 in reverse is less than its maximum forward speed, by a factor equal to the ratio of the associated epicyclic or gearing. With a typical ratio of 3 for the epicyclic unit 56, 57, 59 of FIG. 4 or the gearing sequence 34, 33, 30 of FIG. 1, with an input of 1,000 r.p.m. from the prime mover 2, with unit 1 operating at its maximum ratio, and with mechanism 24 or 54 in its forward setting, the final output 28 will give a vehicle a forward road speed of say 40 k.p.h. With mechanism 24 or 54 in its reverse setting however, but with the ther parameters unchanged, final output 28 will give the vehicle a reverse road speed of only 13.3 k.p.h., without the need for any special mechanical restrictions on maximum reverse speed. This is very beneficial, because high reverse road speeds are dangerous.

In FIG. 1 the capital letters N and T represent angular velocity and torque respectively, and the subscripts E, C, I, T, and O associate those quantities respectively with the output of prime mover 2, the output shaft 5, the impellerr 18, the turbine 19 and the input 23 to the reversing mechanism 24.

In the alternative apparatus of FIG. 5, in which the reversing mechanism between shaft 23 and final output 28 is indicated schematically at 70, an epicyclic combination similar in function to item 16 of FIG. 1 is shown. However, instead of being arranged in the layout of a differential the sun 21a, the annulus 22a and the planets on carrier 15, are now all of spur gear form and arranged with their axes of rotation parallel. Also the hydrokinetic element is a more simple fluid coupling, comprising impeller 18 and turbine 19 only.

A theoretical example will now be described, to illustrate the potential performance of apparatus without the reversing mechanism 24, but otherwise as shown in FIG. 1. In this example it is assumed that the torque converter 17 has a multiplication at stall (s=o) of 2:1, reducing linearly with slip to the coupling point—that is to say, where torque multiplication is zero—when the turbine 19 is running at 90% of the speed of impeller 18 (s=0.9). Assume also that the prime mover 2 produces 100 lb ft torque at full throttle between 1,000 and 5,000 r.p.m. although the "peak" is taken to occur at 2,500 r.p.m.

In the example, the transmission system is used in a vehicle requiring a wide range of output torque TO' say 9 or 10:1. Where the ratio unit is of the toroidal-race rolling traction type such a wide range is difficult to achieve without the complexity and expense of the two-range recirculator system described, for example, is U.S. Pat. No. 3,406,597 and with other types of ratio unit—for instance those using a belt drive—it can be difficult to use such recirculator systems at all. To achieve the 9 or 10:1 ratio using a transmission system according to the present invention and as illustrated, the torque range of the ratio unit should be from say 2.5:1 to 0.4:1, that is to say an overall range of 6.25:1 for output torque TC. The ratio E (annulus/sun) of the epicyclic 16 is 1:1. Stall should correspond with maximum engine torque, i.e. NE=2,500 r.p.m., TE=100 lb ft and with the ratio unit set at its lowest ratio HC will be 1,000 r.p.m. and TC 250 lb ft. If now the extreme final output condition is considered when the value of NO is zero—that is to say when the vehicle wheels are stationary, in the case of an automotive transmission, the speed NI of the impeller 18 will be 2,000 r.p.m. and the impeller torque TI will be 125 lb ft, compared with an engine output torque TE which we have assumed to be 100 lb ft. Using the known formula for two HKE's 'A' and 'B' of equal power that:

'A' and 'B' of equal power that:-

$$\frac{\text{Diameter of } HKE \text{ 'A'}}{\text{Diameter of } HKE \text{ 'B'}} = \left(\frac{\text{maximum input torque 'A'}}{\text{maximum input torque 'B'}}\right)^{3/5}$$

we therefore see that the diameter of torque converter 17 need only be $(125/100)^{3/5} = 1.14$ times the diameter that would be necessary for a torque converter if it were located instead between the prime mover and the ratio unit.

The output torque of converter 17, that is to say the torque exerted by the turbine 19, will be 250 lb ft (i.e. twice TI) to which must be added 125 lb ft from the annulus 22 of epicyclic 16 to give a total final output torque TO of 375 lb ft.

Thus the overall torque range of the ratio unit and torque converter 17 will be 375/450=9.375:1, which is within the stated required range of 9-10:1.

I claim:

1. A transmission system comprising:
    a prime mover;
    a continuously-variable ratio-varying unit (ratio unit);
    said ratio unit comprising a rotary input member adapted to rotate in a single first direction only and presenting an input race of fixed geometry and part-toroidal shape, a coaxial rotary output member adapted to rotate in a second and opposite direction only and presenting an output race of fixed geometry and part-toroidal shape, the said shapes of said input and output races conforming to the outline of a single imaginary torus of circular cross section, and at least one roller rotatable about its axis and arranged to transmit traction at all times from said input race to said output race, said axis of said at least one roller being tiltable whereby to change the orientation of said at least one roller and thereby change the ratio transmitted by said transmission;
    a direct connection, without means of reversal of direction, between said prime mover and said rotary input member of said ratio unit;
    an epicyclic combination comprising at least a first element, a second planet carrier element and a third element arranged in successive engagement;
    a hydrokinetic element comprising at least an impeller element and a turbine element;
    said epicyclic combination and said hydrokinetic element being located in succession between said ratio unit and said a final drive output;
    a connection between one of said epicyclic combination elements and said impeller element;
    a connection between said ratio unit and another of said epicyclic combination elements, and a connection of the remaining one of said epicyclic combination elements both to said turbine element and to said final drive output, and
    a reversing mechanism, located between said hydrokinetic element and said final drive output.

2. A transmission system according to claim 1 in which said hydrokinetic element is a fluid coupling without torque-multiplying effect.

3. A transmission system according to claim 1 in which said hydrokinetic element is a torque converter with torque-multiplying effect.

4. A transmission system according to claim 1 in which said ratio unit is of the toroidal-race rolling-traction type.

5. A transmission system according to claim 1 in which the reversing mechanism has a larger speed reduction in reverse than in forward.

6. A transmission system according to claim 5 in which the reversing mechanism includes a simple epicyclic comprising sun, planet carrier and ring gear, in which said final output is connected to said ring gear, and in which there are clutch/brake means operable alternatively to free said planet carrier and connect said sun directly to said final drive output in forward motion, or to disconnect said final drive output from said sun but to lock said planet carrier whereby said final output is driven by way of said sun, planets and ring gear in reverse motion.

* * * * *